United States Patent
Mayers et al.

(10) Patent No.: US 9,219,619 B2
(45) Date of Patent: *Dec. 22, 2015

(54) SELECTING VIEWPORTS IN A MESSAGING APPLICATION WITH MULTIPLE VIEWPORTS FOR PRESENTING MESSAGES IN DIFFERENT ORDERS

(75) Inventors: Eric B. Mayers, Hayward, CA (US); Douglas T. Hudson, Toms River, NJ (US)

(73) Assignee: GOOGLE INC., Mountain View, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/474,641

(22) Filed: May 17, 2012

(65) Prior Publication Data

US 2012/0233556 A1    Sep. 13, 2012

Related U.S. Application Data

(63) Continuation of application No. 12/192,055, filed on Aug. 14, 2008, now Pat. No. 8,185,492.

(51) Int. Cl.
| | | |
|---|---|---|
| *G06F 3/01* | (2006.01) | |
| *G06F 15/16* | (2006.01) | |
| *H04L 12/58* | (2006.01) | |
| *H04M 3/533* | (2006.01) | |

(52) U.S. Cl.
CPC ............ *H04L 12/58* (2013.01); *H04M 3/533* (2013.01); *H04M 3/53333* (2013.01); *H04L 12/581* (2013.01); *H04L 51/04* (2013.01); *H04M 2201/12* (2013.01); *H04M 2201/36* (2013.01)

(58) Field of Classification Search
None
See application file for complete search history.

(56) References Cited

U.S. PATENT DOCUMENTS

| | | | |
|---|---|---|---|
| 6,654,787 B1 | 11/2003 | Aronson et al. | 709/206 |
| 6,654,791 B1 | 11/2003 | Bates et al. | 709/207 |
| 6,842,775 B1 | 1/2005 | Chastain et al. | 709/207 |
| 7,889,853 B2 | 2/2011 | Sutcliffe | |
| 7,941,491 B2 | 5/2011 | Sood | |
| 2002/0055940 A1 | 5/2002 | Elkan | 707/104.1 |
| 2003/0187937 A1 | 10/2003 | Yao et al. | 709/206 |
| 2003/0195937 A1 | 10/2003 | Kircher, Jr. et al. | 709/207 |
| 2005/0076110 A1 | 4/2005 | Mathew et al. | |
| 2005/0203929 A1 | 9/2005 | Hazarika et al. | 707/100 |
| 2005/0204001 A1 | 9/2005 | Stein et al. | 709/206 |

(Continued)

FOREIGN PATENT DOCUMENTS

KR    2003-0027881    4/2003

OTHER PUBLICATIONS

AbdelRahman, Hassan, Bahgat, "A New Email Retrieval Ranking Approach", International Journal of Computer Science & Information Technology (IJCSIT), vol. 2, No. 5, Oct. 2010.*

(Continued)

*Primary Examiner* — Kakali Chaki
*Assistant Examiner* — Walter Hanchak
(74) *Attorney, Agent, or Firm* — Morgan, Lewis & Bockius LLP

(57) ABSTRACT

In a method for displaying messages, a system displays messages from a single user account in multiple viewports. Each viewport orders messages based on an importance score that is calculated based on the user's prior interactions with messages in his user account through that viewport. Each viewport associated with the user account orders messages using a distinct message importance model.

19 Claims, 7 Drawing Sheets

(56) References Cited

U.S. PATENT DOCUMENTS

| | | | |
|---|---|---|---|
| 2005/0204009 A1 | 9/2005 | Hazarika et al. | 709/206 |
| 2006/0010217 A1* | 1/2006 | Sood | 709/206 |
| 2006/0031340 A1 | 2/2006 | Mathew et al. | 709/206 |
| 2008/0097946 A1* | 4/2008 | Oliver et al. | 706/46 |

OTHER PUBLICATIONS

Del Prete and Capra, "diffeRS: a Mobile Recommender Service", Proceedings of Mobile Data Management (MDM), 2010 Eleventh International Conference on, May 23-26, 2010, pp. 21-26.*

Zhao, Zhang, "An Email Classification Model Based on Rought Set Theory", Active Media Technology, 2005. (AMT 2005). Proceedings of the 2005 International Conference on, May 21, 2005, pp. 403-408.*

Google Inc., Notice of Final Rejection, KR 2011-7005897, Jun. 26, 2013, 4 pgs.

Google Inc., Office Action, JP 2011-523056, Jul. 31, 2012, 2 pgs.

Google Inc., Office Action, KR 2011-7005897, Oct. 19, 2012, 7 pgs.

Google Inc., Supplemental ESR, EP 09807109.5, Nov. 7, 2012, 6 pgs.

Quan, A Unified Abstraction for Messaging on the Semantic Web, Jan. 1, 2003, 10 pgs.

International Search Report and Written Opinion for PCT/US09/53164 dated Sep. 17, 2010.

Bergman et al., "A Personal Email Assistant," Software Technology Laboratory, HP Laboratories Palo Alto, Aug. 22, 2002, 23 pgs.

Chirita et al., "MailRank: Using Ranking for Spam Detection," L3S Research Center, University of Hannover, Germany, 2005, 8 pgs.

Golbeck et al., "Reputation Network Analysis for Email Filtering," First Conference on Email and Anti-Spam (CEAS), Jul. 30-31, 2004, 9 pgs.

"ClearContext Inbox Manager™ for Microsoft Outlook®: Designing a More Effective Inbox," ClearContext Corporation, Mar. 2004, 1-4 pgs.

Google Inc., Notice of Allowance, KR 2011-7005897, Mar. 25, 2014, 1 pg.

Google Inc., Notice to File a Response, KR 2011-7005897, Oct. 22, 2013, 2 pgs.

* cited by examiner

SELECTING VIEWPORTS IN A MESSAGING APPLICATION WITH MULTIPLE VIEWPORTS FOR PRESENTING MESSAGES IN DIFFERENT ORDERS

RELATED APPLICATIONS

This application is a continuation of U.S. patent Ser. No. 12/192,055, filed Aug. 14, 2008 now U.S. Pat. No. 8,185,492, which is hereby incorporated by reference in its entirety.

TECHNICAL FIELD

The disclosed embodiments relate generally to displaying messages, such as email, instant, and voicemail messages. More particularly, the disclosed embodiments relate to systems, methods, and computer programs for displaying ordered messages based on importance factors or scores that are determined from a user's interactions with the messages.

BACKGROUND

As email communication has grown, so too has the number of email messages received and stored in user accounts. A user account typically comprises all the messages sent to and from a respective email address or user name. However, some user accounts may be associated with a plurality of email addresses or user names, sometimes called aliases, which together may be considered to be a single logical email address or user name. The amount of received email can quickly overwhelm users—making it difficult to sift important messages from unimportant ones.

Additionally, many people now access and view their email on mobile devices, such as handheld computers or cell phones. Such mobile devices typically have small screens with even smaller message windows or interfaces for viewing messages. These interfaces often only allow the user to view a small number of messages at any given time, thereby requiring the user to interact more frequently with the interface to locate important messages, such as through scrolling through the messages. Such mobile devices may also employ network connectivity, which is sometimes charged by usage and is often slow. Users of these devices might wish to limit the messages they view to those of high importance when accessing message through this medium.

To deal with these problems, some message interfaces allow users to organize messages into folders or to apply user-defined labels to messages for easier identification. Additionally, in some email applications, users may order messages in a particular view in accordance with the value of single user-selected message header field, such as message delivery date, sender, or message title. However, these organizational techniques often fail to identify the messages that are most important to the user, leaving the user to scroll through many messages before locating the messages that he or she considers to be most important.

SUMMARY OF EMBODIMENTS

It would be highly desirable to provide a message system and method that addresses the above mentioned drawbacks while providing the user with a customized view of messages that are automatically sorted based on their predicted importance to the particular user.

In a method for displaying messages, a system displays messages from a single user account (i.e., the account of a respective user) in multiple viewports. Each viewport orders messages based on an importance score that is calculated based on the user's prior interactions with messages in his user account through that viewport. Each viewport associated with the user account orders messages using a distinct message importance model.

In some embodiments, a first client device displays messages in a viewport ordered by a first importance score calculation and a second client device displays messages from the same user account in a viewport ordered by a second importance score calculation. Importance predictive models are employed to generate the importance scores based on user interactions with messages.

In some embodiments, a client device displays messages in a viewport ordered by a first importance score calculation and displays messages from the same user account in a second viewport ordered by a second importance score calculation.

In another aspect of the invention, a server sends a listing of messages ordered by a first importance score calculation to a first client device and sends another listing of messages from the same user account ordered by a second importance score calculation to a second client device.

In another aspect of the invention, a server sends a listing of messages ordered by a first importance score calculation to a client device and sends another listing of messages from the same user account ordered by a second importance score calculation to the client device.

Some embodiments provide a computer readable storage medium storing one or more programs having instructions for performing the above described methods.

BRIEF DESCRIPTION OF THE DRAWINGS

Like reference numerals refer to corresponding parts throughout the drawings.

DESCRIPTION OF EMBODIMENTS

Figure 1:
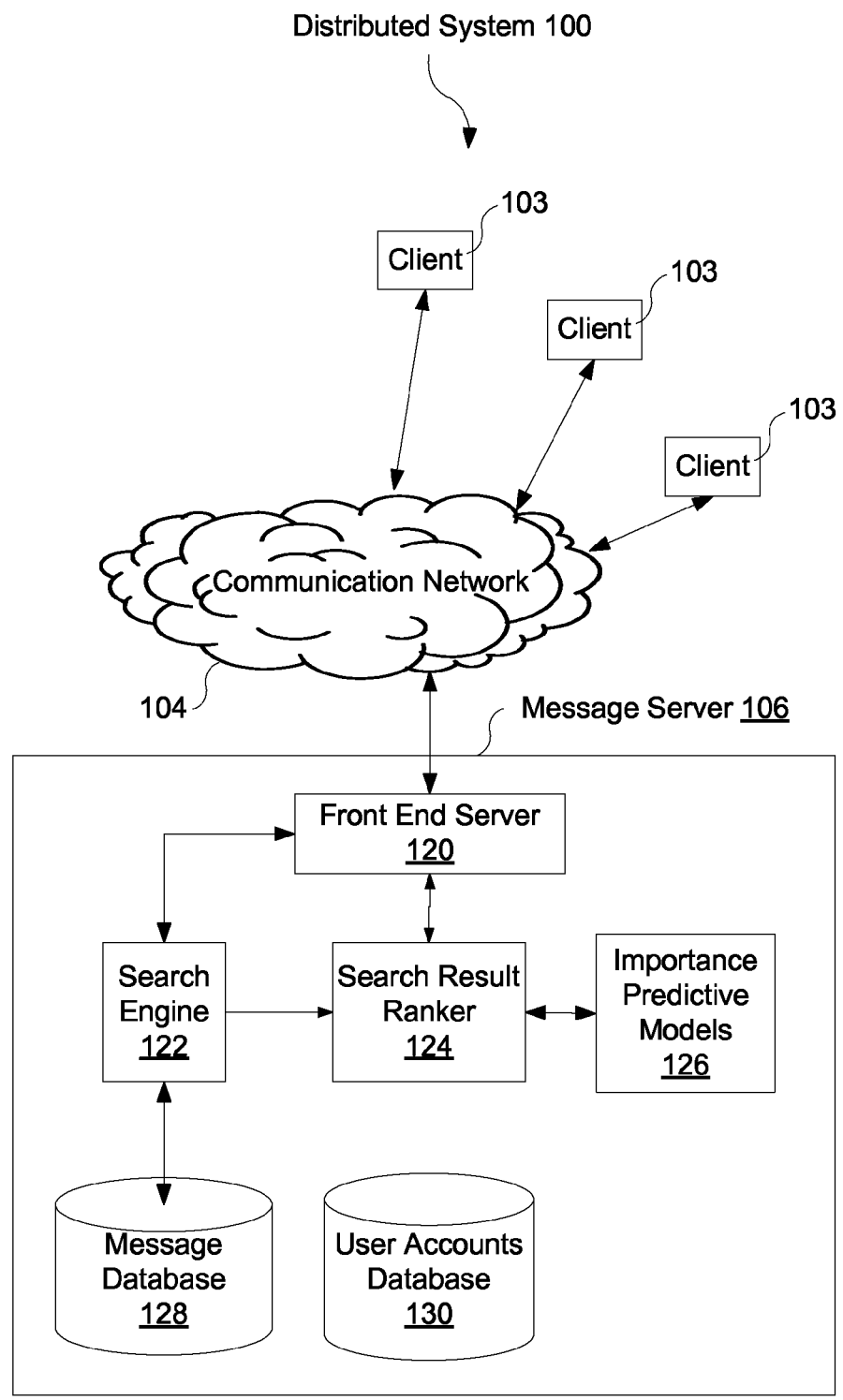
FIG. 1 is a block diagram illustrating the infrastructure of a client-server network environment according to some embodiments.

FIG. 1 is a block diagram of a system 100 for according to some embodiments. One or more clients 103 and a message server 106 are connected to a communication network 104 via any suitable means. The communication network 104 may be one or more, or a combination of one or more, local area networks (LANs), wide area networks (WANs), such as the Internet, or the like.

In some embodiments, the client 103 is any suitable computing device, such as a personal computer, handheld computer, personal digital assistant, cellular-phone, or the like. The client 103 includes one or more software applications or interfaces for viewing messages. Messages, as used herein, refers to any type of communication messages from one person, station, or group to another, including electronic mail (email) messages, instant messages, voicemail messages, or the like.

In some embodiments, the message server 106 includes a front end server 120, a search engine 122, a search result ranker 124, importance predictive models 126, a message database 128, and a user accounts database 130. The search engine 122 communicates with message database 128 to retrieve sets of messages belonging to a particular user account associated with the user accounts database 130. A user account comprises all the messages sent to and from a respective email address or user name. In some cases, a respective user account may be associated with a plurality of email addresses or user names, sometimes called aliases, which together may be considered to be a single logical email address or user name for the purposes of this discussion. The search engine 122 sends the retrieved set of messages to the search result ranker 124, which organizes the message order according to importance scores calculated for each respective message in the set using importance predictive models 126. In one case the set of messages being returned is all new messages.

The message database 128 stores messages for users. In some embodiments, a single message database 128 is used per user account, and, in others, messages from multiple users are stored in the same message database 128. One of ordinary skill in the art will recognize that there are many ways to prevent messages from one user being accessed by other users of the system.

The importance predictive models 126 calculate importance scores for individual messages in at least one user account. One or more importance predictive models 126 is associated with the user account. The importance predictive models 126 calculate importance scores for a set of one or more messages in the user account.

In one embodiment, the importance predictive models 126 are generated using machine learning. Machine learning comprises a set of techniques, implemented using software tools and computer systems, that generate functions and predictive models (e.g., by determining weights to be applied to components of the functions or predictive models). Machine learning is well know to those skilled in the art and is therefore not described in detail in this document. A respective predictive model is used to calculate an importance score, or more than one importance score, for each message in a set of messages. The model is defined to calculate one or more importance scores for a respective message using one or more message quality signals (sometimes called message quality factors, or message importance factors). A respective message quality signal, of a set of predefined message quality signals, may be differently weighted in different predictive models, because the weights applied to a respective message quality signal is determined according to user preferences or prior user actions with respect to messages in the user account.

Examples of message quality signals include: a signal identifying whether the user has read the message, a signal identifying a delay time from receipt of the message to the first time the user has read the message, a signal identifying whether the user has replied to the message, a signal identifying whether the user has forwarded the message, a signal identifying whether the user read the message out of order, a signal indicating the total time the user spent reading a particular message, a signal identifying whether the user has run a search for a message, a signal indicating the number of times the user has read the message, and a signal indicating the affinity of the user to another participant of the message. Other message quality signals that may be used for ordering messages in a viewport include signals based on message header information and signals based on other metadata for the messages.

A viewport is a user interface for viewing and interacting with a set of messages in a user account. A client may provide one or more viewports for viewing messages, i.e., different viewports may exist on the same device, such as different message viewing windows on the same personal computer. A subset of the available message quality signals and other message signals may be combined (e.g., a linear combination, such as a weighted sum, or non-linear combination) to generate importance scores for a particular viewport, which are then used to order the messages for that viewport.

In some embodiments, the importance predictive models 126 use machine learning to build an initial predictive model of important message characteristics for a particular viewport. The model is then applied to each message in a set of messages in order to calculate an importance score for a particular message. The set of messages is then ordered using the search result ranker 124, i.e., sorted for the particular viewport. For example, the search result ranker 124 may order the messages in order of decreasing importance score.

The selection of importance predictive models is dependent upon the selection of a particular viewport at a client. In some embodiments, a viewport may display all messages in a user account, such as would be displayed when viewing the user's entire message inbox. In other embodiments, a viewport may display a subset of messages in a user account such as all messages in a particular folder or subfolder. In yet other embodiments, a viewport may display a subset of messages in a user account, such as all messages to which a particular label has been applied. In further embodiments, a viewport may display a custom subset of messages based on messages the user has explicitly selected. The selection of a viewport provides the messages associated with that viewport to an importance predictive model 126.

A single user account may include more than one importance predictive model 126 to create more than one viewport for displaying or otherwise presenting ordered lists of messages. Each importance predictive model can be used to calculate distinct importance scores for a particular message by utilizing different message quality signals or by different weights to one or more message quality signals. For example, one importance predictive model could be based on the combination of a signal identifying whether a user has replied to a message along with a signal identifying whether a user has forwarded the message. The same user account could include an importance predictive model based on a combination of signals indicating the number of times the user has read a message and a signal indicating the total time spent reading the message. If the user applies each viewport model to the same set (folder, search result, label, etc) of messages, the two viewport models may order the same set of messages differently based on the importance scores independently calculated by each model.

In some embodiments, the mechanisms described below for ordering messages are applied to conversations in lists of conversations, where each conversation is a group of messages that have been grouped together in accordance with predefined criteria. For example, a respective conversation may include an initial message as well as one or more messages that are responses to other messages in the conversation, as well as zero or more messages that forward messages or information from messages in the conversation. While some conversations may include only a single message, a list of conversations in a user account will typically be a plurality of conversations with each having two or more messages. In some embodiments, the importance predictive models and viewport functions described below are applied to the conversations in a list of conversations by applying these mechanisms to each message in each conversation and producing one or more combined importance scores, which are then used to order the conversations. Alternately, the mechanisms described below with respect to message ordering are applied to a subset of the messages in each conversation, in accordance with predefined criteria (e.g., all messages in the conversation when the conversation has N or fewer messages, and otherwise the last N messages in the conversation, or the last message plus the N−1 longest messages in the conversation, where N is a predefined value (e.g., five)). Further information concerning an email application that stores and displays lists of conversations can be found in U.S. Patent Application Publication 2005-0222985 A1, which is hereby incorporated by reference as background information.

Figure 2:
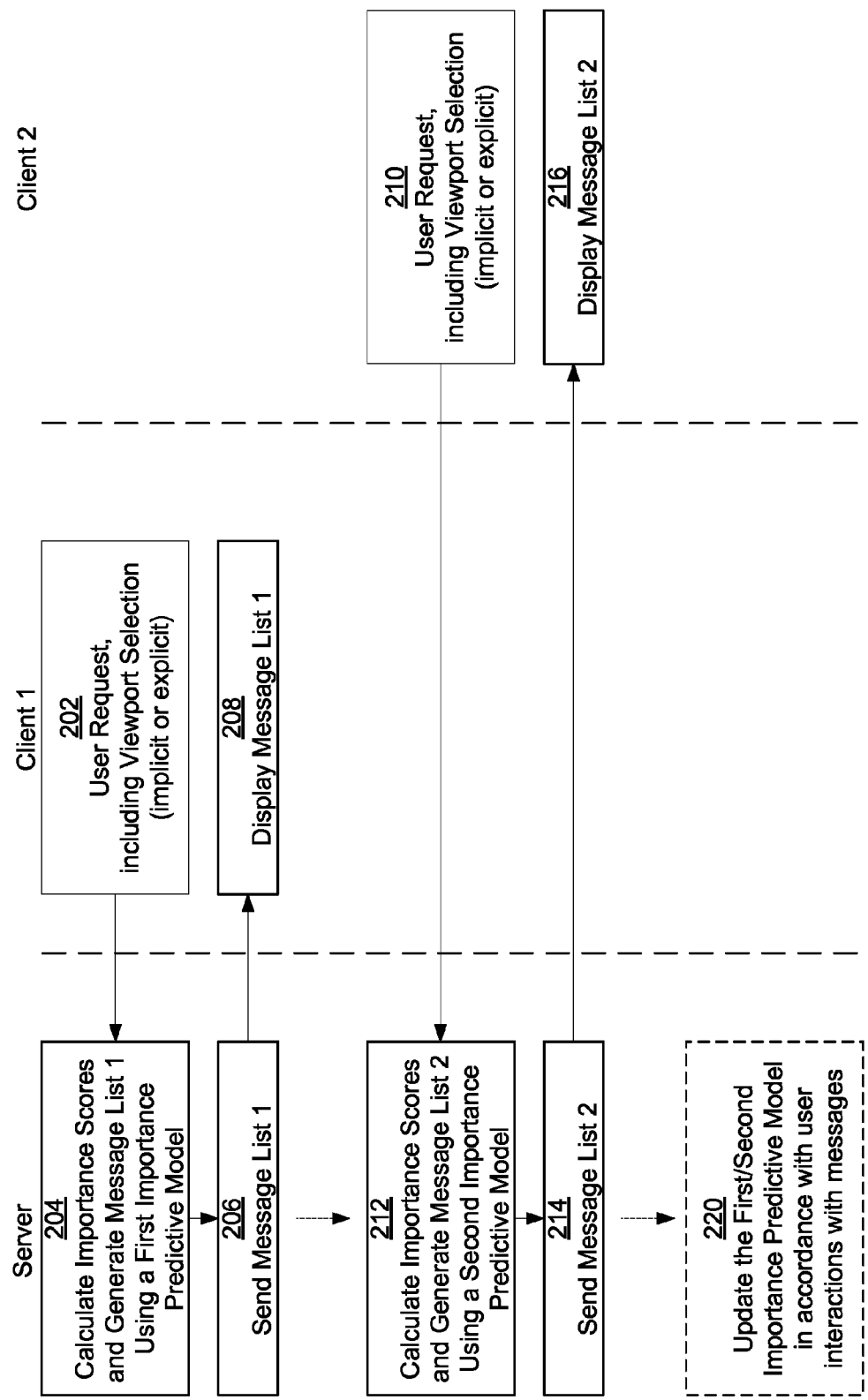
FIG. 2 is a flow diagram illustrating a process of providing ordered message lists to multiple clients according to some embodiments.

FIG. 2 is a flowchart of interaction between the client and the server regarding generating and displaying messages ordered by an importance score. The selection of a viewport triggers a user request 202 for ordering messages based on an importance score. The user request 202 provides information on the selected viewport to the importance predictive models 126 (FIG. 1) and defines the set or subset of messages in the message database 128 the user wishes to view. For example, when the selected viewport is a folder in the user account, the user request 202 includes information identifying the subset of messages belonging to such folder.

In some embodiments, the viewport selection may be made explicitly by the user, such as selecting a folder of messages in a messaging application for viewing. In other embodiments, the viewport selection may be automatically triggered by a client device that automatically selects an importance-based viewport for display upon launch of a message viewing application.

Referring still to FIG. 2, the server receives the user request and identifies a set of messages associated with the selected viewport. The server calculates 204 an importance score for each message in the selected viewport and generates 204 an ordered message list based on the importance scores. The server then sends the generated message list 206 back to the client, which displays 208 the ordered list in the selected viewport.

In one embodiment, a second distinct client device may trigger a user request 210 for a message list ordered by importance score. The second request may be for a distinct set of messages from the first request 202, but from the same user account. Alternatively, the second request may be for the exact same messages as the first request, but come from a second client. Again, the server calculates 212 an importance score, according to an importance predictive model, for each message in the selected viewport and generates 212 an ordered message list based on the importance scores. The server may use the same importance predictive model as in 204 or it may use a distinct importance predictive model depending upon the selected client viewport on the second client. After the server generates 212 the ordered message list, the message list is sent 214 back to the requesting second client. The second client subsequently displays 216 the generated message list in the selected viewport on the second client.

The user requests may be based on a manual selection of a viewport by the user or may be selected based on an automatically triggered viewport selection. In some embodiments, where the user is at a client device such as a personal computer, the user may explicitly select either folders with associated viewports or may even select a predefined or custom viewport to be applied to any particular folder or inbox of the user account. In some embodiments, when the client is accessing messages in his or her user account using a PDA or cell phone, a particular viewport may be automatically selected for use with that device when the user attempts to view messages. For example, the user may have a client application on their cell phone or mobile device that, when launched, automatically selects a particular viewport (e.g., a viewport that displays messages ordered in accordance with their predicted importance to the user).

Periodically, the importance predictive models for each user are updated 220 based on recent user interactions with messages through (i.e., while using) the viewports associated with those important predictive models. In one embodiment, the message status database 416 stores user interactions with messages as further described below. Since each model applies a set of message quality signals to calculate importance scores for messages, updating the models involves retrieving the relevant interaction signals from the message status database 416 (FIG. 4 described below) and applying these signals to the model accordingly. In some embodiments, this process may occur at regular time intervals, such as once every night, while in other embodiments this process may occur more or less frequently. In some embodiments, a respective model may be updated (based on user interactions with messages through (i.e., while using) the viewport associated with the respective model) at a time that is independent of when other models in the same user account are updated.

In some embodiments, the importance predictive models 126 may aggregate message interaction signals from multiple user accounts. The models adapt over time to determine the strongest indicators of message importance for individual users. Aggregating user interaction signals from multiple users provides another means of building an importance predictive model 126. The model may update itself by retrieving relevant interaction signals stored in the message status database 416 for multiple users and applying these signals to the model accordingly.

Figure 3:
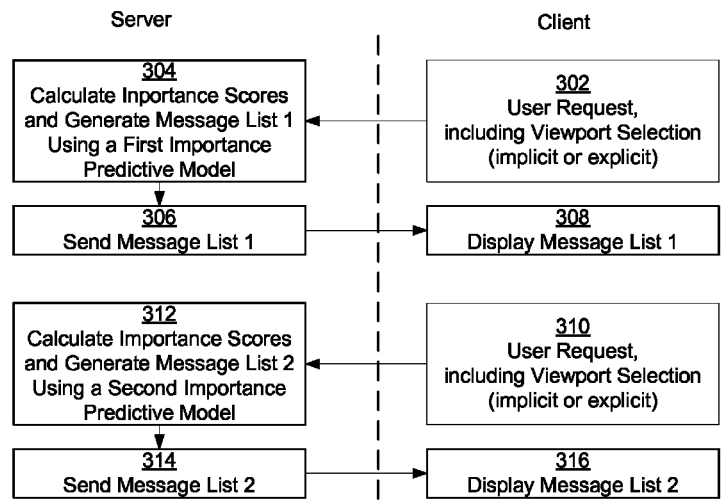
FIG. 3 is a flow diagram illustrating another process of providing ordered message lists to a single client according to some other embodiments.

FIG. 3 is a flowchart of another embodiment of the interactions between the client and the server relating to the generation and display of important messages in viewports. A user action at a first client device triggers a user request 302 for an importance-score based message list. The server receives the first request, calculates importance scores for each message according to a predictive model, and generates an ordered message list at 304. The server then sends 306 the generated message list back to the client, which displays 308 the list in the selected message viewport.

In one embodiment, the same client may trigger a second request, at 310, for a different viewport that uses a distinct importance predictive model from that used in the previous step. The second request may also be for a distinct set of messages from those requested by the first request 302. For example, the second request 310 may be for a message folder different than the one chosen in the first request 302.

The server receives the second request, calculates importance scores for each message according to a predictive model, and generates an ordered message list at 312. Here, however, the server uses the importance predictive model associated with the selected client viewport. This model may be the same importance predictive model as in step 304 or the model could be distinct from the previous importance predictive model. In some embodiments, a user may associate the same importance predictive model to multiple folders. In that scenario, the server would apply the same importance predictive model to the distinct message lists associated with the first request 302 and the second request 310.

After the server generates the current message list at 312, it sends the ordered message list 314 back to the requesting client. The requesting client subsequently displays this ordered message list 316 in the respective message viewport at the client.

In some embodiments, a user may wish to apply different importance predictive models to the same set messages in similar viewports on different clients. For example, a user may wish to view important messages in a particular folder in his account while a home and at work. Messages which are important to the user while he is at work, for example, may differ from messages which are important to him while he is at home. In such a scenario, the selection of the same folder from similar viewports on different clients will order the messages differently by applying different importance predictive models to at least some of the same messages.

In some embodiments, user location context information may describe the user's physical location (e.g., home, work, car, etc.) and may additionally describe the current time of day. The physical location information may be defined and selected by the user directly. For example, the user may create different profiles for each location or time of day. Each profile is then associated with a different viewport, and, therefore, importance predictive models. The physical location of the client may be automatically determined using well-known positioning technologies, such as the Global Positioning System (GPS). For example, the user's cellular-phone may know when the user is at home based on the user's current positioning location, and then associate an appropriate viewport and importance predictive model to the user's messages.

Referring back to FIG. 3, the second user request 310 may also provide the user's location to the server. The server, upon receipt of the second request 310, uses such location information to select an appropriate importance predictive model. The server may then proceed to generate 312 a message list as described above. By allowing the user's location to aid in selecting an importance predictive model, a user may associate multiple importance predictive models with the same message set.

Figure 4:
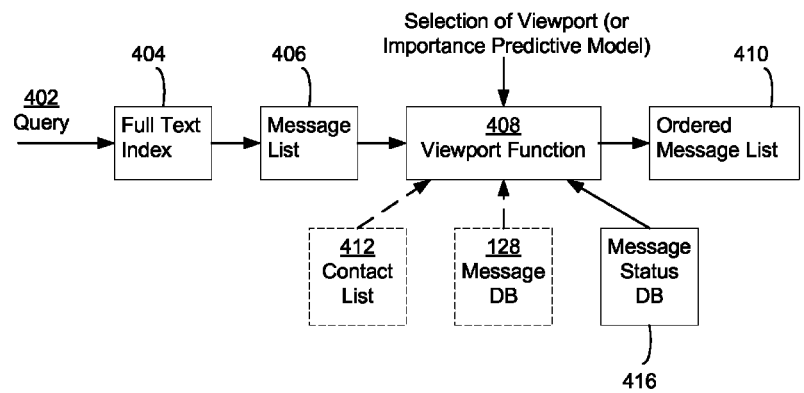
FIG. 4 is a flow diagram illustrating a process of generating an ordered message list according to some embodiments.

FIG. 4 is a flowchart of the process for generating an importance ordered message list. A user query to generate an importance ordered message list is received by the server at 402. The user query is made to the full text index at 404. A message list is then retrieved at 404 in response to the user query. The resulting message list is inputted to a viewport function 408 that determines individual message importance scores and generates an ordered message list at 410.

In some embodiments, the process may start with the message list 406, as the client may identify a specific set of messages related to a viewport. In such case, the query 402 and full text index 404 may not be needed to determine the message list 406 for input to the viewport function 408. For example, if the user selects a viewport associated with a folder in the user account, the messages for that folder may be determined using information stored in message database 128, in which case a full text index search is not required to generate message list 406.

In some embodiments, the viewport function 408 determines an importance score for each message in the message list 406 through the use of one or more importance predictive models, a contact list 412, a message database 128, and a message status database 416. The message status database 416 stores status information, including information indicating whether a message has been read or not. The message status database 416 may also store other status information, such as one or more of the following: the number of times a respective message has been opened or read, the amount of time the user has kept the message open for reading, the number of times the user has responded to the message, the number of times the user has forwarded the message, and so on. The models may be used in cooperation with the contact list 412 to calculate an importance score for each message. The contact list 412, as described later, maintains affinity scores for other message participants which help to identify important users. Affinity scores may be used by a respective importance predictive model to boost the importance scores of messages sent by contacts (e.g., people, companies, etc.) in the user's contact list 412. For example, messages from contacts having high affinity scores in the user's contact list may receive a larger importance score boost than messages from contacts with lower affinity score and messages from people or entities not listed in the user's contact list. This information may be combined in the viewport function 408 with other portions of the importance score calculation performed by the importance predictive model used by the viewport function.

Figure 5A:
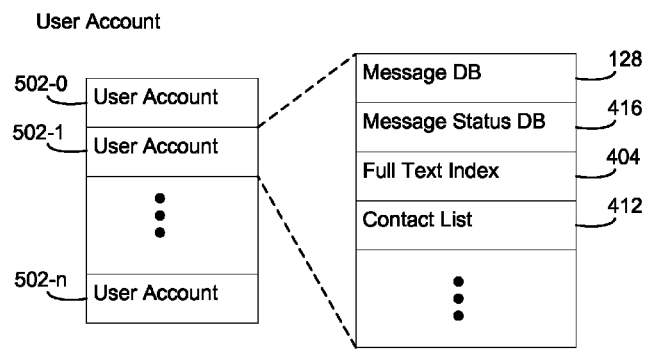
FIGS. 5A-5D are block diagrams illustrating data structures used for generating an ordered message list according to some embodiments.

FIG. 5A depicts an exemplary user account record 502 in the user accounts database 130 (FIG. 1) according to some embodiments. Some of the information that can be associated with a user account record 502 includes a message database 128 (FIG. 1), a message status database 416 (FIG. 4), a full text index 404 (FIG. 4), and a contact list 412 (FIG. 4). Some of the information may be stored in separate user databases or, in some embodiments, may be stored in a single database for all users.

Figure 5B:
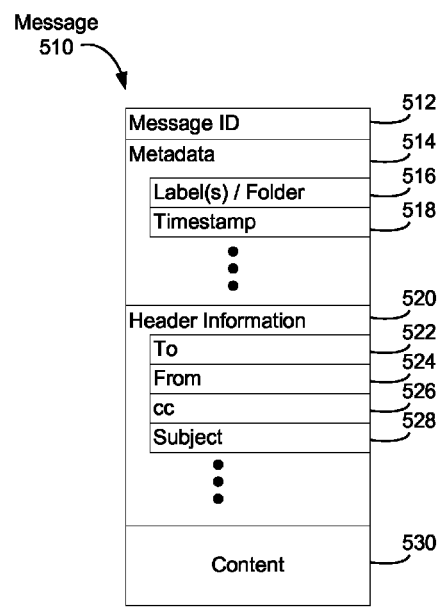

FIG. 5B depicts an exemplary message record 510 in the message database 128 according to some embodiments. The message record 510 includes a message identifier 512 that uniquely identifies the message. In some embodiments, the message identifier 512 is associated with a single message. In some embodiments, the message identifier 512 is associated with a group of messages comprising a conversation. Some of the information that can be associated with a message 510 includes metadata 514, header information 520, and content 530.

In some embodiments, the metadata 514 includes information relevant to the message such as label or folder 516 assignments and a timestamp 518. Each message in the message database 128 may be assigned to a folder in the user account. Additionally, a user may apply one or more labels 128 to any message in his user account. The timestamp 518 provides information indicating the time that the message was received by the user account. The timestamp 518 may be valuable in calculating a user's time spent interacting with that message.

The header information 520 may include the header information of the message including, for example, information identifying the sender 524 and recipients 522, a message received date and time value (sometimes called a date value or a time value) of the message, and the subject 528. Other information might also be included in the header information, as described in RFC 2822, which is incorporated herein by reference. The message content 530 may contain the content of the message. The content 530 may include text, images, and attachments. Those of ordinary skill in the art would recognize other ways to store the message information. For example, an attachment might be stored in another storage structure and a reference to it located in the message 510.

Figure 5C:
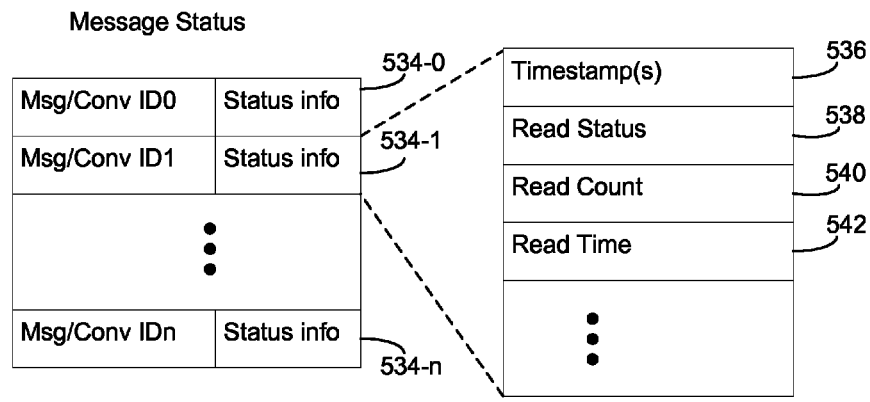

FIG. 5C depicts an exemplary message status record 534 in the message status database 416 according to some embodiments. Each message status record 534 includes a message or conversation identifier and a set of status information for a single message in the message database 128. In some embodiments, the status information includes one or more timestamps 536 and a set of fields representing the variety of user interactions tracked for the representative message. The one or more timestamps 536 may be used in calculating message quality signals indicating a length of time spent by the user performing various message interactions. For example, one timestamp may identify the first time a user read a message while another timestamp may identify the most recent time a user has read a message. The first timestamp may be used to determine the delay between receipt of the message to the user reading the message. The second timestamp may be used to determine the length of time between readings of the message by the user.

The set of record fields in the message status record 534 correlate to the message quality signals used by importance predictive models 126. For example, the set of fields may include the status of whether a particular message has been read, a count of the number of times the message has been read, and a value of the total time a user has spent reading the message. The set of fields may also include other message quality signal indicators such as whether a message has been forwarded or whether a message has been replied to.

Figure 5D:
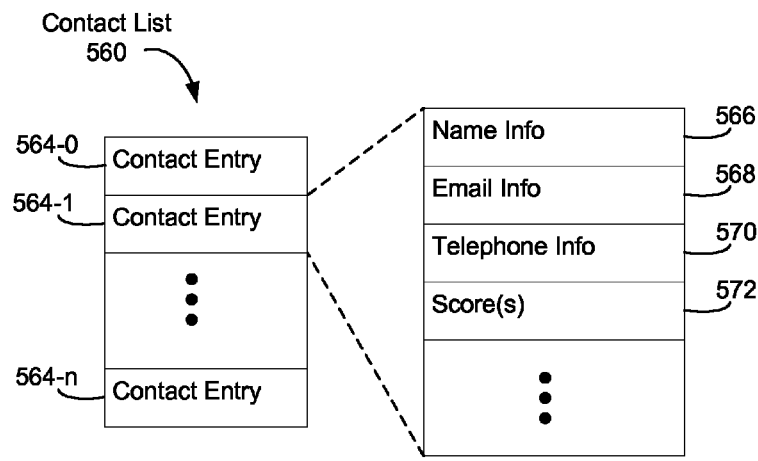

FIG. 5D depicts an exemplary contact entry 564 in the contact list 412 (FIG. 4) according to some embodiments. Each contact entry 564 represents a single contact with which the user has communicated or may communicate using messages as defined above. Each contact entry 564 includes information concerning the name of the contact 566, email contact information of the contact 568, telephone contact information 570, and one or more affinity scores 572 for the contact. The one or more affinity scores 572 provide numerical representation of the user's affinity to a particular contact with respect to calculating importance scores for messages. In one embodiment, the affinity scores may influence the importance score assigned to a message received from a contact (e.g., person, company or other entity) listed in the user's contact list. In some embodiments, each affinity score 572 is representative of a quantity of communication activity between the contact and the user. Contributions (e.g., communications sent to or sent by a respective contact) to an affinity score may be time weighted, so that more recent contributions are more heavily weighted than older contributions.

In some embodiments, the type of client device and the time of day may influence the weight associated with an affinity score 572 as it is applied by one or more importance predictive models. For example, if the user is viewing messages on his work PDA during work hours, the affinity score 572 for a contact entry 564 representing a supervisor may be assigned greater weight than if the user is viewing messages at his home personal computer on the weekend. Alternately stated, the viewports used in these two contexts may assign different weights to a respective affinity score 572.

Figure 6:
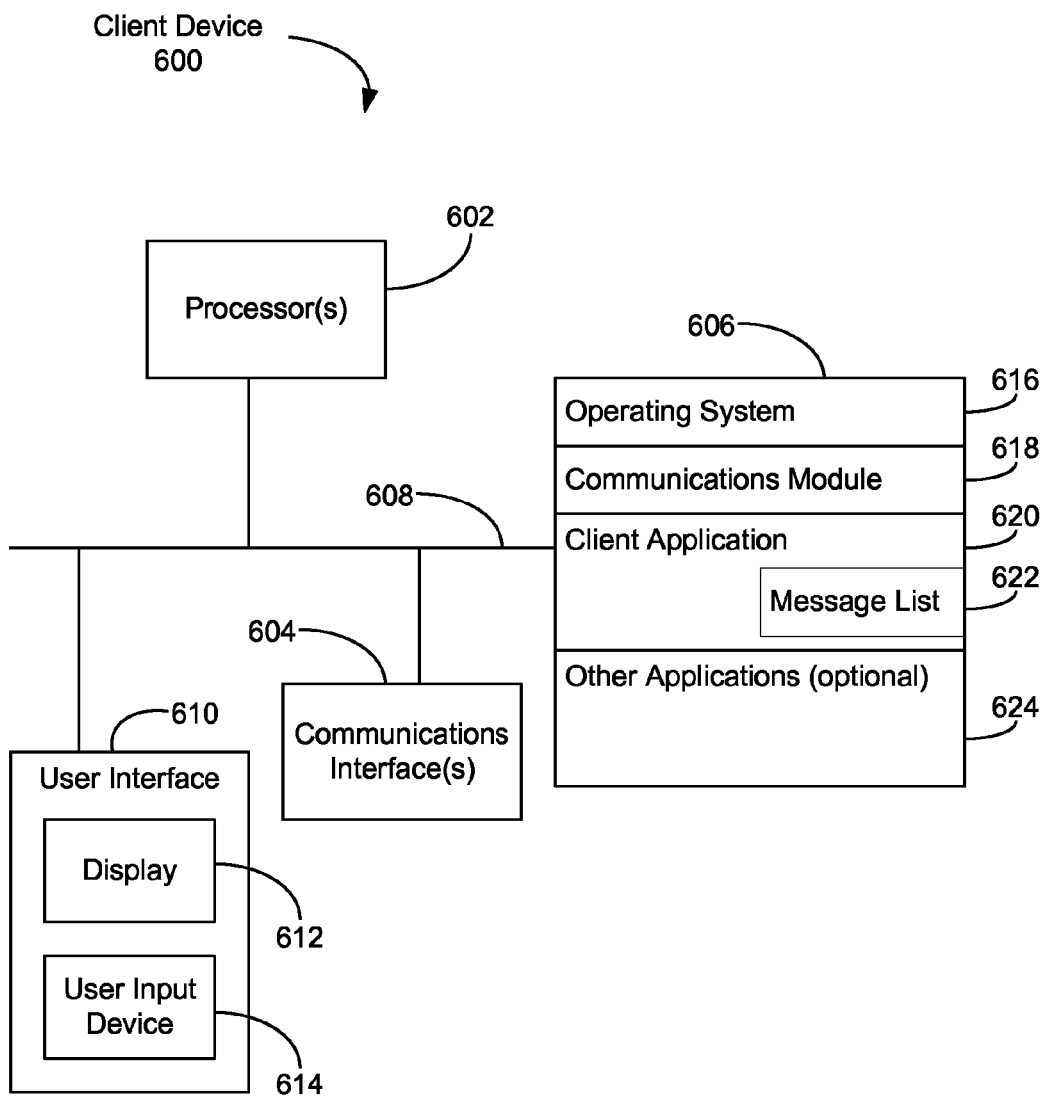
FIG. 6 is a block diagram of an exemplary client in accordance with some embodiments.

FIG. 6 is a block diagram of a client device 600. In some embodiments, the device 600 includes one or more processing units (CPU's) 602; one or more network or other communications interfaces 604; memory 606; a user interface 610 (which may include a display 612 and a user input device 614); and one or more communication buses 608 for interconnecting these components. The communication buses 608 may include circuitry (sometimes called a chipset) that interconnects and controls communications between system components. Memory 606 includes high speed random access memory. such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 606, or alternately the non-volatile memory device (s) within memory 606, comprises a computer readable storage medium. In some embodiments, memory 606 includes mass storage that is remotely located from the central processing unit(s) 602. Also in some embodiments, memory 606 stores the following programs, modules, and data structures, or a subset thereof:

- an operating system 616 that includes procedures for handling various basic system services and for performing hardware dependent tasks;
- a communication module 618 that is used for connecting the client device 600 to other computers via the one or more communication network interfaces 604 (wired or wireless), and one or more communication networks 104 (FIG. 1), such as the Internet, other wide area networks, local area networks, metropolitan area networks, and so on;
- a client application 620 for viewing and interacting with messages in viewports, including the display of an importance score-based message list 622; and
- other optional client applications 624.

Figure 7:
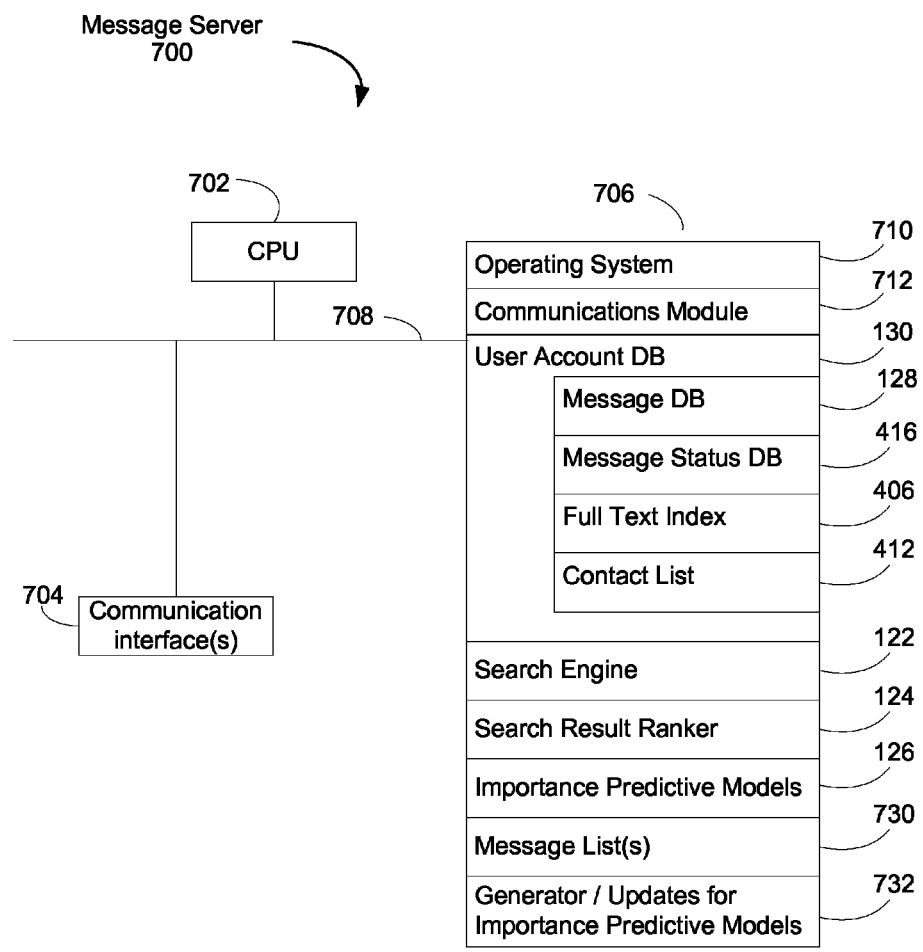
FIG. 7 is a block diagram of an exemplary server in accordance with some embodiments.

FIG. 7 is a block diagram illustrating a message server 700 in accordance with one embodiment of the present invention. In some embodiments, the message server 700 includes one or more processing units (CPU's) 702; one or more network or other communications interfaces 704; memory 706; and one or more communication buses 708 for interconnecting these components. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706, or alternately the non-volatile memory device (s) within memory 606, comprises a computer readable storage medium. Memory 706 may optionally include one or more storage devices remotely located from the CPU(s) 702. In some embodiments, memory 706 stores the following programs, modules and data structures, or a subset thereof:

- an operating system 710 that includes procedures for handling various basic system services and for performing hardware dependent tasks;
- a network communication module 712 that is used for connecting the message server 700 to other computers via the one or more communication network interfaces 704 (wired or wireless), and one or more communication networks 104 (FIG. 1), such as the Internet, other wide area networks, local area networks, metropolitan area networks, and so on;
- a user account database 130 that includes user account information; a message database 130, a message status database 416, a full text index 406, and a user contact list 412;
- a search engine 122 that is used to provide message list results based on user queries (e.g., queries specifying words or terms that may be located within the content of one or more messages, and/or queries specifying metadata values (e.g., date, folder, label, sender name, participant name, etc.) that may be associated with one or more messages)
- a search result ranker 124 that provides functionality to order messages based on importance scores associated with messages;
- one or more importance predictive models 126 that are used to generate importance scores for messages;
- message lists 730 that are generated at the server for the purpose of ordering and sending to clients; and an updater module 732 for importance predictive models that processes message quality signals and updates the models accordingly.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above.

Although FIG. 7 shows a "message server," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a message server and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for displaying messages performed by a client device having one or more processors and memory storing one or more programs for execution by the one or more processors to perform the method, comprising:
   at the client device:
   in response to a first user action at the client device:
      selecting a first window from a plurality of distinct windows for viewing and interacting with messages; and
      displaying at the client device a first list of messages in the first window, the first list of messages being ordered by a first importance score calculated using a first importance predictive model that corresponds to the first window; and
   in response to a second user action at the client device:
      selecting a second window, distinct from the first window, from the plurality of distinct windows for viewing and interacting with messages; and
      displaying at the client device a second list of messages in the second window, the second list of messages being ordered by a second importance score calculated using a second importance predictive model that corresponds to the second window;
   wherein
   the first and second lists of messages each comprise messages in a single user account;
   the single user account includes the first and second importance predictive models; and
   the first and second importance predictive models are not identical.

2. The method of claim 1, wherein the selecting of one of the first window and second window comprises selecting one of the first window and second window based at least in part on a physical location of the client device.

3. The method of claim 1, wherein the selecting of one of the first window and second window comprises selecting one of the first window and second window based at least in part on a type of the client device.

4. The method of claim 1, wherein the selecting of one of the first window and second window comprises selecting one of the first window and second window based at least in part on time of day associated with the client device.

5. The method of claim 1, wherein the first user action is a user selection of a messaging application at the client device.

6. The method of claim 1, wherein the first importance predictive model is based on a respective user's prior interactions with messages.

7. The method of claim 1, wherein the second importance predictive model is based on a respective user's prior interactions with messages.

8. The method of claim 1, wherein the first importance predictive model is based on multiple users' prior interactions with messages.

9. The method of claim 1, wherein the second importance predictive model is based on a multiple users' prior interactions with messages.

10. A method for sending messages to client devices, performed by a server system having one or more processors and memory storing one or more programs for execution by the one or more processors to perform the method, comprising:
   at the server system:
   in response to a first user action selecting a first window for viewing and interacting with messages at a first client device:
      selecting a first importance predictive model corresponding to the first window;
      using the first importance predictive model to calculate first importance scores for respective messages and generate a first list of messages ordered in accordance with the first importance scores; and
      sending to the first client device instructions to display the first list of messages in the first window;
   in response to a second user action selecting a second window for viewing and interacting with messages at the first client device:
      selecting a second importance predictive model corresponding to the second window;
      using the second importance predictive model to calculate second importance scores for respective messages and generate a second list of messages ordered in accordance with the second importance scores; and
      sending to the first client device instructions to display the second list of messages in the second window;
   wherein
   the first and second lists of messages each comprise messages in a single user account;
   the single user account includes the first and second importance predictive models; and
   the first and second importance predictive models are not identical.

11. The method of claim 10, wherein selecting the second window comprises selecting the second window based at least in part on a physical location of the respective client device.

12. The method of claim 10, wherein selecting the second window comprises selecting the second window based at least in part on a type of the respective client device.

13. The method of claim 10, wherein selecting the second window comprises selecting the second window based at least in part on time of day associated with the respective client device.

14. The method of claim 10, wherein the first or second importance predictive model is based on a respective user's prior interactions with messages.

15. The method of claim 10, wherein the first or second importance predictive model is based on multiple users' prior interactions with messages.

16. A non-transitory computer readable storage medium storing one or more programs, the one or more programs comprising instructions for:
at a client device,
in response to a first user action at the client device:
selecting a first window from a plurality of distinct windows for viewing and interacting with messages; and
displaying at the client device a first list of messages in the first window, the first list of messages being ordered by a first importance score calculated using a first importance predictive model that corresponds to the first window; and
in response to a second user action at the client device:
selecting a second window, distinct from the first window, from the plurality of distinct windows for viewing and interacting with messages; and
displaying at the client device a second list of messages in the second window, the second list of messages being ordered by a second importance score calculated using a second importance predictive model that corresponds to the second window;
wherein
the first and second lists of messages each comprise messages in a single user account;
the single user account includes the first and second importance predictive models; and
the first and second importance predictive models are not identical.

17. A non-transitory computer readable storage medium storing one or more programs, the one or more programs comprising instructions for:
at a server system:
in response to a first user action selecting a first window for viewing and interacting with messages at a first client device:
selecting a first importance predictive model corresponding to the first window;
using the first importance predictive model to calculate first importance scores for respective messages and generate a first list of messages ordered in accordance with the first importance scores; and
sending to the first client device instructions to display the first list of messages in the first window;
in response to a second user action selecting a second window for viewing and interacting with messages at the first client device:
selecting a second importance predictive model corresponding to the second window;
using the second importance predictive model to calculate second importance scores for respective messages and generate a second list of messages ordered in accordance with the second importance scores; and
sending to the first client device instructions to display the second list of messages in the second window;
wherein
the first and second lists of messages each comprise messages in a single user account;
the single user account includes the first and second importance predictive models; and
the first and second importance predictive models are not identical.

18. A client device, comprising:
one or more processors; and
memory storing one or more modules configured for execution by the one or more processors, the one or more modules including:
instructions, responsive to a first user action at the client device, for:
selecting a first window from a plurality of distinct windows for viewing and interacting with messages; and
displaying at the client device a first list of messages in the first window, the first list of messages being ordered by a first importance score calculated using a first importance predictive model that corresponds to the first window; and
instructions, responsive to a second user action at the client device, for:
selecting a second window, distinct from the first window, from the plurality of distinct windows for viewing and interacting with messages; and
displaying at the client device a second list of messages in the second window, the second list of messages being ordered by a second importance score calculated using a second importance predictive model that corresponds to the second window;
wherein
the first and second lists of messages each comprise messages in a single user account;
the single user account includes the first and second importance predictive models; and
the first and second importance predictive models are not identical.

19. A server system, comprising:
one or more processors; and
memory storing one or more modules configured for execution by the one or more processors, the one or more modules including:
instructions, responsive to a first user action selecting a first window for viewing and interacting with messages at a first client device, for:
selecting a first importance predictive model corresponding to the first window;
using the first importance predictive model to calculate first importance scores for respective messages and generate a first list of messages ordered in accordance with the first importance scores; and
sending to the first client device instructions to display the first list of messages in the first window;
instructions, in response to a second user action selecting a second window for viewing and interacting with messages at the first client device, for:

selecting a second importance predictive model corresponding to the second window;

using the second importance predictive model to calculate second importance scores for respective messages and generate a second list of messages ordered in accordance with the second importance scores; and sending to the first client device instructions to display the second list of messages in the second window;

wherein the first and second lists of messages each comprise messages in a single user account;

the single user account includes the first and second importance predictive models; and the first and second importance predictive models are not identical.

\* \* \* \* \*